United States Patent [19]

Nakajima et al.

[11] Patent Number: 4,538,176

[45] Date of Patent: Aug. 27, 1985

[54] BUFFER MEMORY DISPERSION TYPE VIDEO/AUDIO TRANSMISSION SYSTEM

[75] Inventors: Hirohito Nakajima, Tokyo; Katsumi Haji, Narashino; Yoji Shibata; Wataru Kosuge, both of Yokohama, all of Japan

[73] Assignees: Hitachi, Ltd.; Nippon Telegraph & Telephone Public Corporation, both of Tokyo, Japan

[21] Appl. No.: 97,364

[22] Filed: Nov. 26, 1979

[30] Foreign Application Priority Data

Nov. 24, 1978 [JP] Japan ................. 53-144160

[51] Int. Cl.³ ............................... H04N 7/10
[52] U.S. Cl. .................... 358/86; 358/102; 358/903
[58] Field of Search ............ 358/85, 86, 102, 143, 358/903; 179/1 B; 455/3, 4, 5, 6; 381/77, 78, 80

[56] References Cited

U.S. PATENT DOCUMENTS

| | | | |
|---|---|---|---|
| 3,500,327 | 3/1970 | Belcher et al. | 340/154 |
| 3,729,581 | 4/1973 | Anderson | 358/903 |
| 3,789,137 | 1/1974 | Newell | 358/143 |
| 3,806,649 | 4/1974 | Jinguji et al. | 179/2 TU |
| 3,936,595 | 2/1976 | Yanagimachi et al. | 358/143 |
| 4,183,054 | 1/1980 | Patisaul et al. | 358/86 |

OTHER PUBLICATIONS

Hiratsuka et al–High Speed Polling System for Multi--Purpose Catu, Jap. Telecomm. Review, vol. 19, #1, Jan. 1977, pp. 20-28.

*Primary Examiner*—Joseph A. Orsino, Jr.
*Attorney, Agent, or Firm*—Antonelli, Terry & Wands

[57] ABSTRACT

A video/audio transmission system for sending video and audio information from video and audio files of a center to a subscriber through a subscriber's junction line is disclosed in which at least one subcenter having a video/audio buffer memory, an exchange and the like is disposed near to the subscriber to reduce the number of repeaters arranged on the subscribers junction line, and in which the video and audio information is transmitted from the center to the sub-center in a time division multiplex fashion to reduce the number of transmission lines between the center and the sub-center.

5 Claims, 7 Drawing Figures

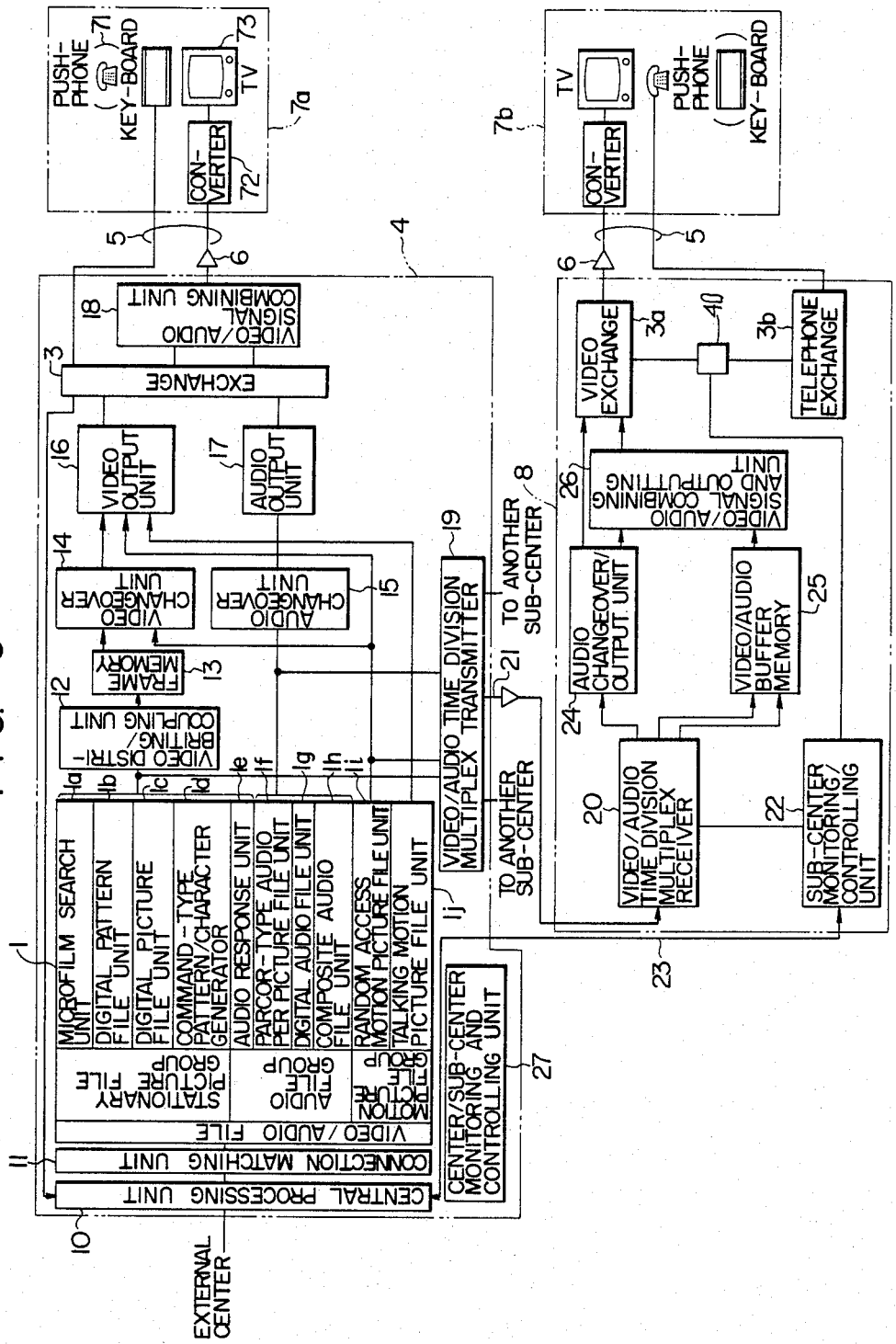

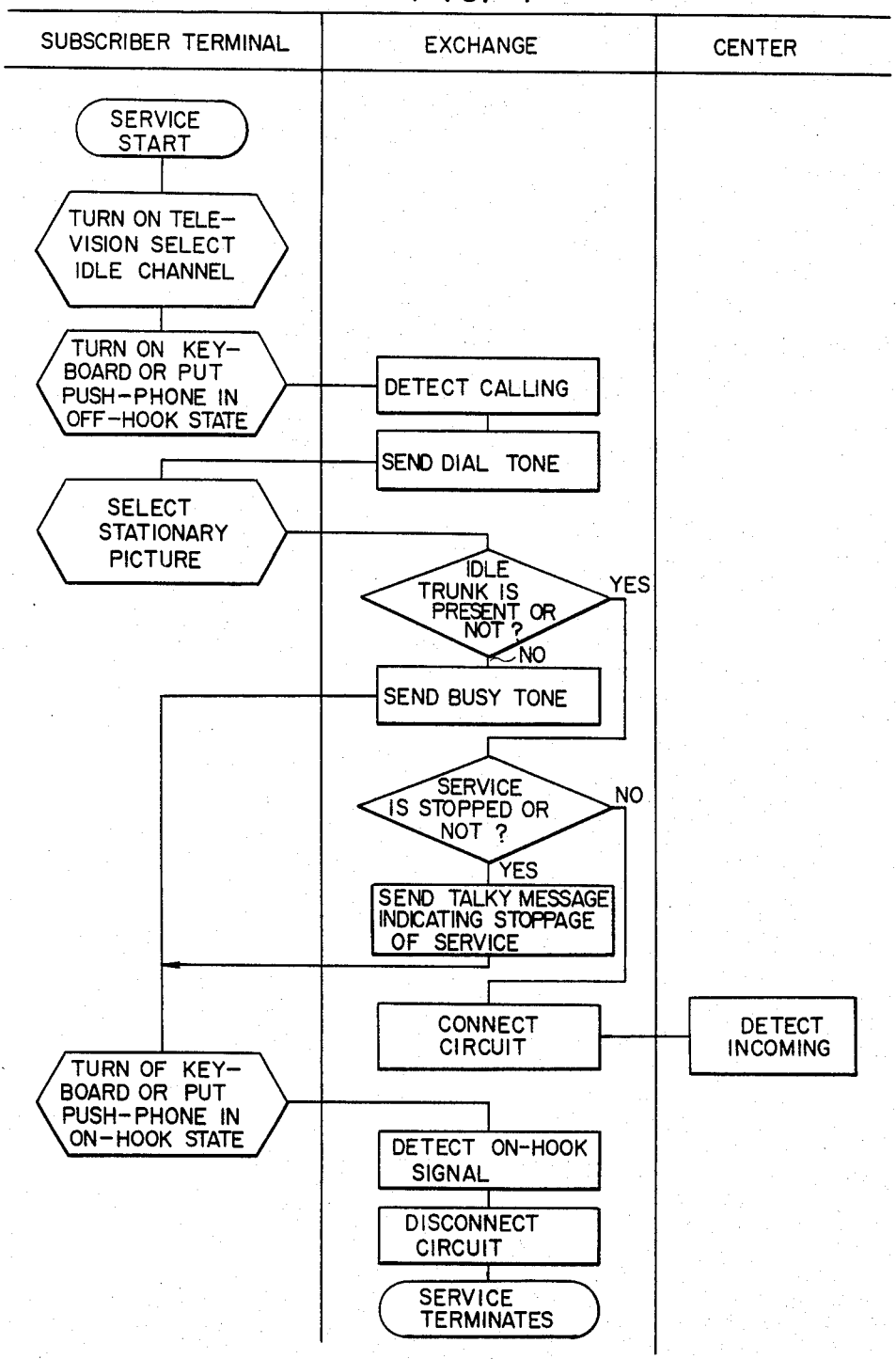

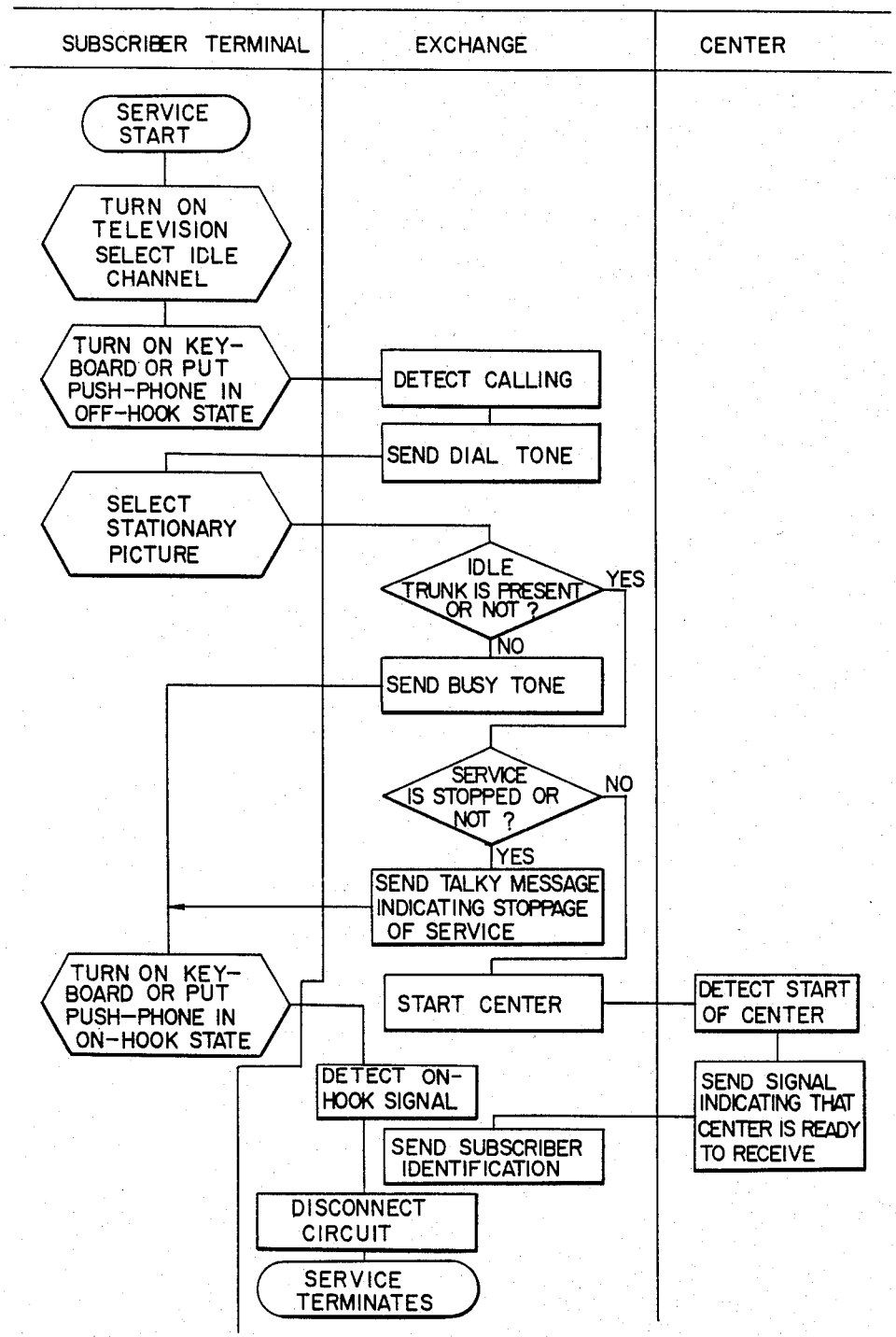

BUFFER MEMORY DISPERSION TYPE VIDEO/AUDIO TRANSMISSION SYSTEM

The present invention relates to an information service system for providing multiplex information such as picture images and data in which the telephone communication system and the television broadcasting system which represent a basic media forming a nationwide communication network, are combined with each other, and more particularly to a buffer memory dispersion type video/audio transmission system which is provided with sub-centers each including buffer memories.

As information is increased in variety and becomes highly-advanced, many countries have expended a great effort to put to practical use an information service system which employs a wide-band, large-capacity communication network and can provide multiplex information such as picture images and data.

For example, the multi-purpose utilization of the broadcasting and telephone networks, each of which provides a basic medium of communication, has been studied. As for the utilization of broadcasting waves, in addition to the character multiplex broadcasting system (TELETEXT) which has been put to practical use in England, the audio multiplex broadcasting system and a character multiplex broadcasting system have been tested in many countries. Further, as for the utilization of the telephone network, the Post Office in England has conducted the examination of an information service system (PRESSTEL) for this purpose and has received a favorable evaluation.

Attempts heretofore made at the multi-purpose utilization of the broadcasting and telephone networks may be classified as follows: (1) Effective utilization of the existing communications networks, (2) Establishment of local, small-scale information service systems for the public, and (3) Prevalence of information service systems for exclusive (private) use.

The objects, features and advantages of the present invention will become apparent from the following detailed description of a preferred embodiment thereof taken in conjunction with the accompanying drawings, in which:

FIG. 3 shows a detailed circuit arrangement of the embodiment shown in FIG. 2;

FIG. 4 is a flow chart for explaining a service requesting procedure in the case where a subscriber terminal connected with a sub-center requests a stationary picture to a center;

FIG. 5 is a flow chart for explaining a service requesting procedure in the case where a subscriber terminal connected with a sub-center requests a stationary picture to a center.

Figure 1:
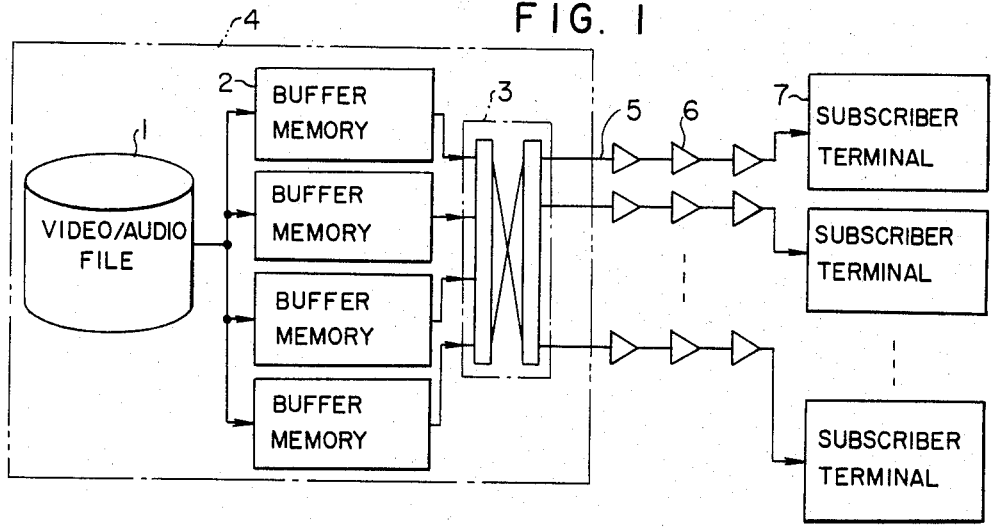
FIG. 1 is a block diagram showing a conventional video/audio transmission network.

According to the conventional center-to-end type video/audio communication system which has been put to practical use, a video/audio transmission network has a circuit arrangement such as shown in FIG. 1 of the accompanying drawings. That is, in a center 4 are installed a video/audio file 1, a video/audio buffer memory 2 and an exchange 3. Further, the center 4 is connected to each of the subscriber terminals 7 through a junction line (existing telephone line) which includes a plurality of repeaters. Accordingly, when the distance between the center 4 and the subscriber terminal 7 is made long, the number of repeaters, which must be provided at intervals of about 500 meters, is increased, and therefore the transmission network becomes expensive.

An object of the present invention is to provide a video/audio transmission system which can overcome the drawback of the conventional system and is low in cost.

In order to attain the above object, in a video/audio transmission system according to the present invention, the buffer memories, the exchange and the like, which have been provided within the center in the conventional system, are moved to sub-centers which are placed near to the subscriber terminals, in order to reduce the length of the subscriber's junction line for connecting the exchange to the subscriber terminal. Since the system includes a large number of junction lines, the decrease in length of each junction line can reduce the number of repeaters required, and therefore can reduce the cost of the system to a considerable degree.

Further, it is another object of the present invention to provide a video/audio transmission system in which the number of transmission lines for interconnecting the center to the sub-centers and the number of repeaters are both reduced to a large degree, and besides a video signal and an audio signal are both transmitted by a single transmission line in the same signal form in order to facilitate the maintenance and surveillance of the system.

Figure 2:
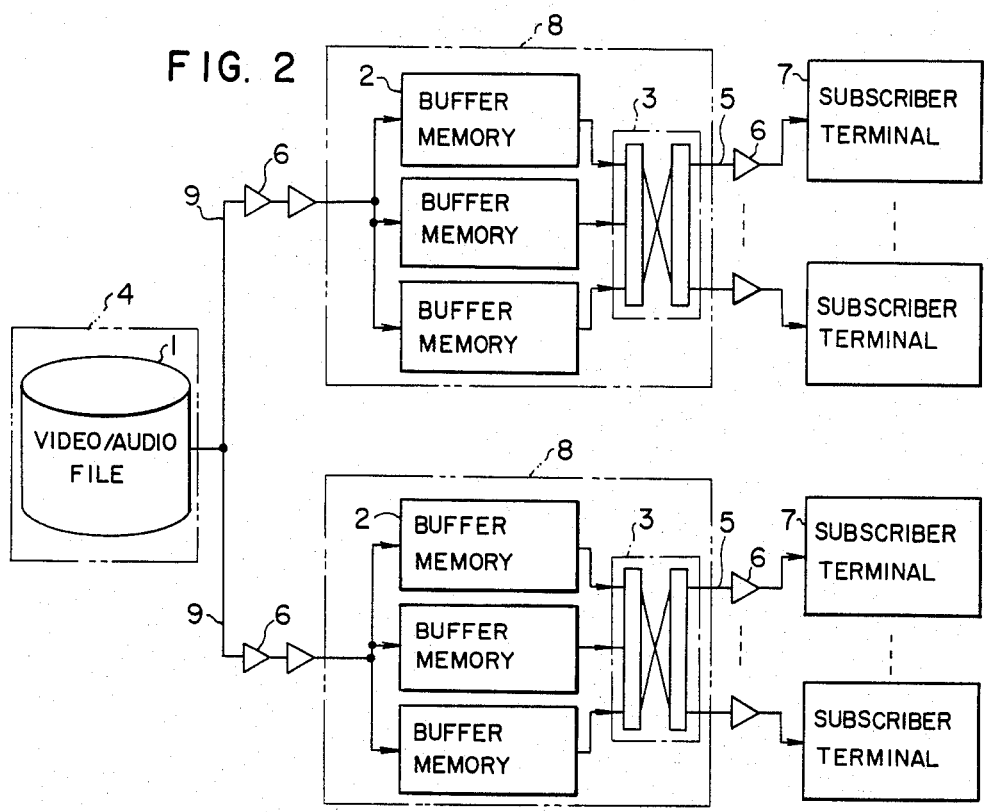
FIG. 2 is a block diagram showing an embodiment of a video/audio transmission network according to the present invention.

The embodiment of the present invention shown in FIG. 2 will be explained below in detail. Referring to FIG. 2, a video/audio file 1 is provided within a center 4, and each of sub-centers 8 includes a buffer memory 2 and an exchange 3. The center 4 is connected to each sub-center 8 by an inter-office junction line 9 of a single channel. Further, since the sub-center 8 is placed near to each of the subscriber terminals 7, a subscriber's junction line 5 is short in length. The number of repeaters included in the whole system is proportional to the length of the subscriber's junction line 5. Accordingly, the embodiment shown in FIG. 2 includes a small number of repeaters and therefore is low in cost.

FIG. 3 shows a detailed circuit arrangement of the embodiment shown in FIG. 2. In FIG. 3, reference numeral 10 denotes a central processing unit 10 for controlling the system, and 11 a connection matching unit for connecting and matching the central processing unit 10 to a video/audio file unit 1. The video/audio file unit 1 is made up of a video file group for stationary pictures, an audio file group and a video file group for motion pictures. The video file group for stationary pictures includes a microfilm search unit 1a, a digital pattern file unit 1b, a digital picture file unit 1c and a command-type pattern/character generator 1d. The audio file group includes an audio response unit 1e, a PARCOR-type audio per picture file unit 1f, a digital audio file unit 1g and a composite audio file unit 1h. The video file group for motion pictures includes a random access motion picture file unit 1i and a talking motion picture file unit 1j. The video file group for stationary pictures is connected to a frame memory 13 through a video distribution/coupling unit 12. The audio file group is connected to an audio output unit 17 through an audio changeover unit 15. Both of the frame memory 13 and the random access motion picture file unit 1i are connected to a video output unit 1g through a video changeover unit 14. Further, the random access motion picture file unit 1i and the talking motion picture file unit 1j are both connected directly to the video output unit 16. The video output unit 16 and the audio output unit 17 are both connected to a video/audio signal combining unit 18 through a six-wire system exchange 3, and then connected to a subscriber junction line 5. Further, the video file group for stationary pictures, the audio file group and the random access motion picture file unit 1i are connected to a video/audio time division multiplex transmitter 19.

The center 4 having such construction as described above is connected not only to the sub-centers but also to a subscriber terminal 7a which is placed near to the center. In more detail, the terminal 7a is connected to the exchange 3 of the center 4 through the video/audio signal combining unit 18, the subscriber's junction line 5 and a repeater 6, but a subscriber terminal 7b which is located far from the center 4 is connected to the center 4 through the sub-center 8.

The sub-center 8 is connected to the center 4 in such a manner that a video/audio time division multiplex receiver 20 of the sub-center 8 is connected to the video/audio time division multiplex transmitter 19 by a multiplex transmission line 21 and a sub-center monitoring/controlling unit 22 of the sub-center is connected to the central processing unit 10 by a data line 23.

Further, the sub-center 8 has the circuit construction as mentioned below. The video/audio time division multiplex receiver 20 is connected to an audio changeover/output unit 24 and a video/audio buffer memory 25, both of which are connected to a video/audio signal combining and outputting unit 26. The sub-center monitoring/controlling unit 22 is connected via control unit 40 to a video exchange 3a for changing over video receivers and to a telephone exchange 3b for changing over push-phones or key-boards. Both of the audio changeover/output unit 24 and the video/audio signal combining and outputting unit 26 are connected to the video exchange 3a. Incidentally, reference numeral 27 designates a center/sub-center monitoring and controlling unit.

Next, explanation will be made on a service requesting procedure in the case where the subscriber terminal requires an information service to the video/audio file.

In the subscriber terminal 7a which is located near to the center 4, the power source of the television receiver 73 is first checked, as is shown in FIG. 4. The receiver 73 which has been turned off, is turned on, and an idle channel is selected. Next, the key-board is turned on, or the push-phone 71 is put in the off-hook state, and the center 4 is called through dialing. In the subscriber terminal, a desired stationary picture is selected by means of the push-button or the key-board when the subscriber terminal receives a dial tone which the center 4 transmits after the detection of calling. In the exchange 3, the presence or absence of an idle trunk is detected. When the idle trunk is absent, a busy tone is sent to the subscriber terminal, but when the idle trunk is present, it is judged whether the service is stopped or not. When the service is stopped, a talky message for reporting the stoppage of service is sent to the subscriber terminal. When the service is not stopped, a predetermined circuit connection is effected. That is, in the center 4, a title (or index) is sent out after the detection of an incoming request, to be checked by the subscriber terminal, and then the file information required or requested by the subscriber terminal can be sent to the subscriber terminal.

In the above sending operation, video and audio signals are sent through the video and audio output units 16 and 17 and the exchange 3 to the video/audio signal combining unit 18 in which a carrier of 4.5-MHz is frequency-modulated by the audio signal and then is superposed on the video signal (base band signal). The signal thus formed is sent to the subscriber terminal 7a through the subscriber's junction line 5. In the subscriber terminal 7a, the above signal is converted by a converter 72 into a video signal of the NTSC system (or PAL system), and then is received by the television receiver 73.

In the case where the center 4 has completed the above sending operation, when the subscriber terminal 7a receives the busy tone because of the absence of an idle trunk, or when the terminal 7a receives the talky message for reporting the stoppage of service, the keyboard is turned off or the push-phone is put in the on-hook state, and the exchange 3 disconnects the circuit after the detection of an on-hook signal. Thus, the service terminates.

Next, explanation will be made of the case where an information service is required by the subscriber terminal 7b connected to the exchanges 3a and 3b of the sub-center 8, with reference to FIG. 5. The service requesting procedure from the start to the judgement in the exchange 3b as to whether the service is stopped or not, is the same as has been explained in connection with the subscriber terminal 7a. When the service is not stopped, the sub-center monitoring/controlling unit 22 sends out a signal for starting the center 4. Upon receipt of the above signal, the center 4 sends out a signal indicating that the center is ready to receive, and takes in the subscriber's number from the sub-center 8. Subsequently, a title (or index) is sent out, and then video and audio signals required by the subscriber terminal 7b are sent to the video/audio time division receiver 20 through the video/audio time division transmitter 19. The audio signal is superposed on the video signal in the same manner as the case where video and audio signals are sent from the center 4 to the subscriber terminal 7a. The signal thus formed is sent to the subscriber terminal 7b.

Figure 6A:
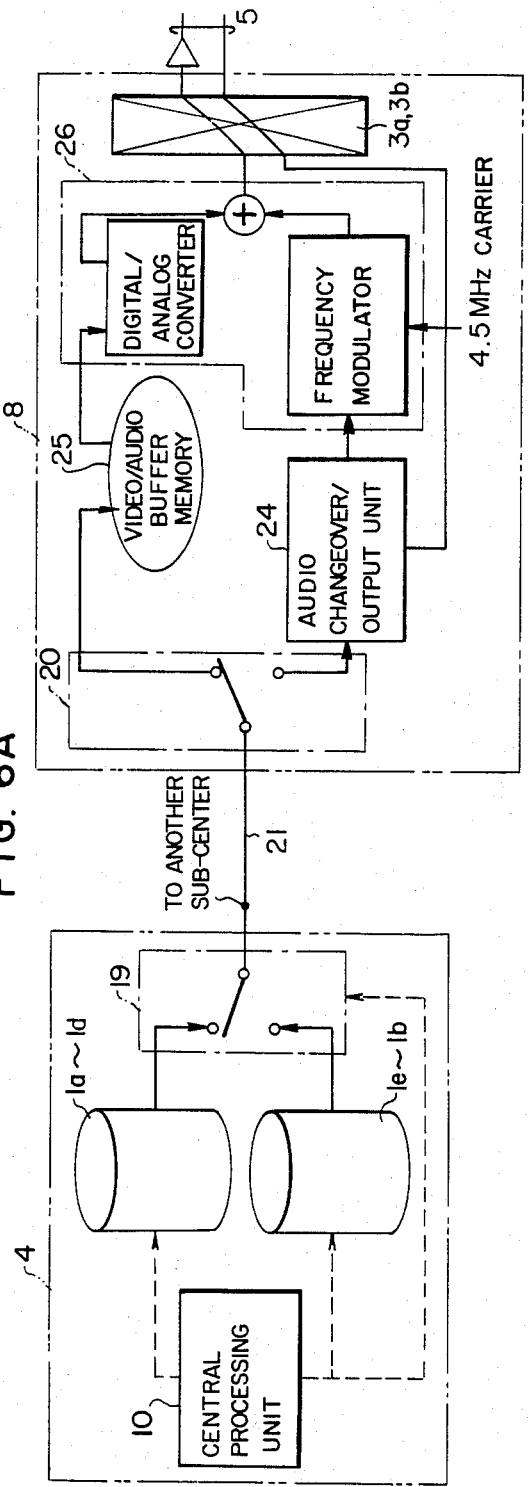
FIGS. 6A and 6B show schematic diagrams for illustrating a transmission system for transmitting video/audio signals between a center and sub-centers.
Figure 6B:
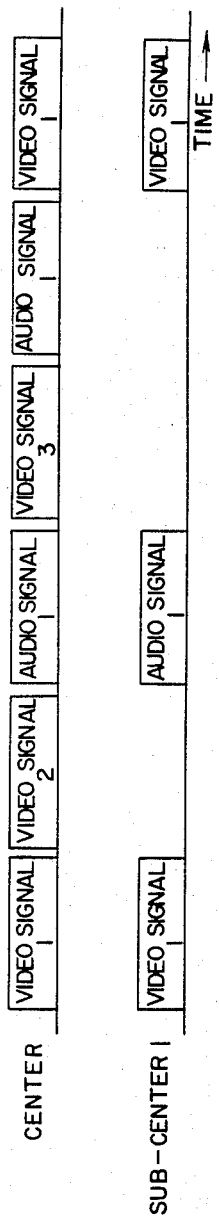

The video and audio signals are sent from the center 4 to the sub-center 8 in the following manner. That is, the audio signal is compressed with respect to the time axis when taken out of the audio file, and thus the frequency of the audio signal is increased to the frequency band of the base band signal of television. In other words, the audio signal is made nearly equal in form to the video signal. Then, the video and audio signals are transmitted in a time division multiplex fashion, as is shown in FIGS. 6A and 6B. In more detail, a video signal for one frame and an audio signal for one frame are both sent from the center 4 to a specified sub-center through a specified channel. In the specified sub-center 8, the video signal is separated from the audio signal, and is written in the buffer memory 25. The audio signal which has been compressed with respect to the time axis, is expanded by the audio changeover/output unit 24 to the real time. In the video/audio combining and outputting unit 26, a carrier of 4.5 MHz is frequency-modulated by the expanded audio signal, and then is superposed on the video signal which is read out of the buffer memory 25 through an analog/digital converter. The signal thus formed is sent to the subscriber terminal 7b through the video exchange 3a and the subscriber's junction line 5.

As has been described hereinbefore, according to the present invention, since the subscriber's junction line for connecting a subscriber terminal to an exchange can be made short in length, the number of repeaters is reduced, and therefore the cost of the whole system can be reduced.

What is claimed is:

1. A buffer memory dispersion type video/audio transmission system comprising:
    a plurality of subscriber terminal units each including a telephone set and/or a keyboard, a video-audio receiver, and a converter for converting a video signal and an audio signal transmitted in a base band to a standard television signal;
    a center including a group of audio files for storing audio information and a group of video files for storing video information, and a central processing unit responsive to a requesting command received from said subscriber terminal units for fetching specific video and/or audio information from said files and for transmitting the fetched information in time division multiplex form;
    a plurality of sub-centers each accommodating thereto a plurality of said subscriber terminal units and each including a plurality of video and audio buffer memories for temporarily storing specific video information and specific audio information received from said center in time division multiplex form, a D/A converter for digital to analog converting the information of said audio buffer memory, a modulator for modulating a carrier wave by the audio information, and exchange means for combining outputs of said D/A converter and said modulator and for connecting said sub-center to a subscriber terminal lunit requesting information; and
    a first transmission line connecting said sub-centers in common to said center and a plurality of second transmission lines connecting the respective sub-centers to a respective subscriber terminal unit, the length of said second transmission lines being shorter than the length of said first transmission line, said first transmission line enabling transmission in time division multiplex form and said second transmission lines enabling transmission in base band form.

2. A buffer memory dispersion type video/audio transmission system according to claim 1, wherein said center comprises a frame memory, video distributing coupling means for transferring picture information from said video files to said frame memory, a video output unit, video changeover means for transferring information from said frame memory to said video output unit, an audio output unit, audio changeover means for transferring audio information from said audio files to said audio output unit, and exchange means for transferring video and audio information from said video output unit and said audio output unit to a subscriber terminal unit, said exchange means being connected to said subscriber terminal unit by means of a third transmission line which is also shorter in length than said first transmission line.

3. A buffer memory dispersion type video/audio transmission system according to claim 2, wherein said center further includes connection matching means for connecting said video files and said audio files to said central processing unit.

4. A buffer memory dispersion type video/audio transmission system according to claim 1, wherein said audio information as stored in said audio files is in a time compressed form so as to fall within a frequency band substantially equal to the frequency band of said video information, said center including video/audio time division multiplex transmitter means for transmitting said video and audio information via said first transmission line to a sub-center, each sub-center including video/audio time division multiplex receiver means for receiving information from said first transmission line.

5. A buffer memory dispersion type video/audio transmission system according to claim 1, wherein said first transmission line enables direct connection between said center and said plurality of sub-centers, and said second transmission lines enable direct connection between a respective sub-center and a respective subscriber terminal unit.

* * * * *